United States Patent
Li et al.

(10) Patent No.: US 8,180,726 B2
(45) Date of Patent: May 15, 2012

(54) CONSTRAINT FAILURE ANALYSIS USING CONSTRAINT EVALUATION TREE OF CONSTRAINT PATTERNS

(75) Inventors: Ying Li, Beijing (CN); Tian Cheng Liu, Beijing (CN); Jing J. Luo, Beijing (CN); Jie Qiu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 946 days.

(21) Appl. No.: 12/174,884

(22) Filed: Jul. 17, 2008

(65) Prior Publication Data

US 2009/0063572 A1 Mar. 5, 2009

(30) Foreign Application Priority Data

Aug. 28, 2007 (CN) .......................... 2007 1 0148136

(51) Int. Cl.
*G06F 17/30* (2006.01)

(52) U.S. Cl. ........................................... 706/62

(58) Field of Classification Search ............... 706/62
See application file for complete search history.

(56) References Cited

U.S. PATENT DOCUMENTS

| | | | |
|---|---|---|---|
| 4,480,513 A | 11/1984 | McCauley et al. | |
| 6,321,186 B1 | 11/2001 | Yuan et al. | |
| 2005/0086562 A1 | 4/2005 | Demsky et al. | |
| 2008/0097974 A1* | 4/2008 | Chen et al. ................ | 707/4 |

OTHER PUBLICATIONS

Hussmann, H., Demuth, B., Finger, F.: Modular Architecture for a Toolset Supporting OCL. in: UML'2000—The Unified Modeling Language. Advancing the Standard, Third Int. Conference York, UK, Oct. 2000, Springer, 2000.*
A V Aho, M. Ganapathi, and S.W.K. Tjiang, "Code Generation Using Tree Matching and Dynamic Programming," ACM Trans. Programming Languages and Systems, Oct. 1989, pp. 491-516.*
W.N. Robinson, "Extended OCL for Goal Monitoring," Electronic Comm. EASST, Jan. 2008, pp. 1-12.*

* cited by examiner

*Primary Examiner* — Jeffrey A Gaffin
*Assistant Examiner* — Ola Olude Afolabi
(74) *Attorney, Agent, or Firm* — Suiter Swantz pc llo

(57) ABSTRACT

A method and device for performing a constraint failure analysis on an instance model. The present invention provides a convenient tool to bridge between a model-constraint designer and a model user, reduce load for model/constraint usability, simplify the learning curve, and assist to make a model correction for the model user.

20 Claims, 15 Drawing Sheets

CONSTRAINT FAILURE ANALYSIS USING CONSTRAINT EVALUATION TREE OF CONSTRAINT PATTERNS

CROSS-REFERENCE TO RELATED APPLICATIONS

The present application claims the benefit under 35 U.S.C. §119 of China; Application Serial Number 200710148136.7, filed Aug. 28, 2007 entitled "METHOD AND DEVICE FOR ANALYSIZING CAUSE OF CONSTRAINT VIOLATION BASED ON CONSTRAINT PATTERN," which is incorporated herein by reference.

TECHNICAL FIELD

The present invention relates to a method and device for constraint violation (failure) analysis used in model verification, and in particular, to a method and device for pattern based constraint violation analysis for root cause identification in model verification.

BACKGROUND

Currently, a model driven approach has been widely used in software development and system management, where the model integrity is critical to guarantee that the approach can be implemented correctly.

In order to make sure the model integrity, constraints are applied for model integrity verification. Taking the model driven deployment as an example, the below constraints are required to guarantee that the deployment model can be correctly implemented in the IT environment: port unique constraint indicating all the network module deployed on the same OS should have the unique port value; collocation constraint indicating the database instance and its dependent user should be directly or indirectly hosted on the same OS; and so on.

Further, the Object Constraint Language (OCL) is a language that enables one to describe expressions and constraints on object-oriented models and other object modeling artifacts. In the prior art, OCL is widely adopted to express details about Unified Modeling Language (UML) that are either hard or even impossible to express in a diagrammatic way. The expression is an indication or specification of a value. A constraint is a restriction on one or more values of (part of) an object-oriented model or system.

Below, a standard model created by a model-constraint designer using UML language in the prior art will be described.

FIG. 1(a), (b) and (c) are model level indications created using UML language, where Class A on the left of FIG. 1(a) is a model element created for a main domain, and comprises attribute of the Class A(has its corresponding attribute), e.g. foo. Class B on the right is a composition class of Class A, i.e. a finer class divided under Class A, and Class B also has its corresponding attribute, e.g. foo 1. Class B may be indicated with an id, for example, b, and then Class B may be uniquely acquired by applying the operation of the id b to Class A. That is, operation of "Class A.b" in a system may locate from Class A to Class B via a unique path. Namely, the expression "Class A.b" may be considered as the path from Class A to Class B.

Class B may be a set, which includes several elements. For example, as shown in FIG. 1(b) which indicates a main domain of a car system. Class A indicates some kind of car, and its composition class, i.e. Class B indicates the wheels of this kind of car where four elements are included, and are front-right wheel FR-W, front-left wheel FL-W, behind-right wheel BL-W, and behind-left wheel BL-W, each element having its own attribute.

In the above system, a constraint condition may be applied to the created standard model. For example, the constraint condition may be "number of wheels is 4". The constraint is represented as a expression of OCL language, "self.b→size( )=4", as shown in FIG. 1(c). The meaning of the expression is that after locating to Class B from Class A uniquely, Class B is logically operated, and size of the set is resolved, that is, the number of the elements therein is calculated out, wherein "self.b" represents "Class A.b", and "→size( )" means the logic operation performed on Class B, i.e. "Class A.b" for its size. In this example, the size thereof is 4, namely the car should have four wheels.

Then a standard model is created, and has the constraint condition as above.

In practice, a model user creates his own appreciate instance model based on the above standard model, and verifies the created instance model with the constraint condition of the standard model to check whether the created instance model is correct, that is, whether the above standard model is complied with. If a false occurs in verification, correction is required to be performed on the created instance model.

Model problem analysis is critical for model correction. In the prior art, many toolsets support validation against UML and EMF by OCL language, but there is no tool to support model problem analysis when OCL constraint violation occurs (i.e. the instance model does not comply with the constraint condition prescribed by the standard model)□ Namely, there is no tool to analyze the OCL expression to assist the model correction.

Therefore, in the prior art, when a model user, for example, a car manufacturer, has created its instance model and verifies it using the constraint condition of the standard model, if a false occurs in the instance model created by the manufacturer, namely the created instance model violates the constraint condition of the standard model, then the verification by using the standard model can only give a verification result such as "True" or "False" to the model user without more detailed information. A detailed description will be made in conjunction with FIG. 2.

FIG. 2 is a graphic representation of process creating a standard model in the prior art.

As shown in FIG. 2, the figure on the left represents the type of model to be created, and specifically a software unit "Unit" of which attribute is "version", and it is required that a certain relationship, for example, a relationship of a hostee and host among respective units, must exist among various software units. According to the model type on the left of FIG. 2, software units WAS, JDBC, and OS (operation system)□as shown on the right of FIG. 2□are created and a constraint condition that WAS and JDBC should be hosted by the same OS is given. This constraint condition is represented as:

Context WAS inv:self.host=self.resolve("/JDBC").host

Here, "Context WAS" indicates that the constraint is started to be applied at the software unit WAS, "self" indicates the software unit WAS itself, "host" represents the software unit "OS" that WAS will be hosted thereon, "self.host" refers to the path from WAS to OS, "self.resolve("/JDBC")" means finding JDBC from WAS, and "self.resolve("/JDBC").host" indicates the path from JDBC to OS.

Verification to the instance model in the prior art will be described in conjunction with FIGS. 3 and 4.

FIG. 3 is an example of the instance model.

Assume there exists an instance model as shown in FIG. 3. When verifying whether the created instance model is correct, the above constraint expression self.host=self.resolve("/JDBC").host is calculated, which defines that WAS and JDBC should be hosted by the same OS. Since relationships between JDBC and WAS and between OS1 and OS2 have not been created therein, false will occur in the model verification. The result returned by the above verification is that "self." encounters a null point and "self.resolve("/JDBC")" encounters a null point, namely, OS1 and OS2 cannot be reached from WAS and JDBC respectively, and subclasses cannot be obtained from the higher-level class thereof. However, the desired result in this case is that "JDBC" and "WAS" should have been hosted on the operation system. The above prior art verification cannot obtain the above result.

FIG. 4 is another example of the instance model.

In the instance model shown in FIG. 4, "JDBC" and "WAS" are hosted on different operation systems OS1 and OS2, that is, a relationship of "JDBC" to "OS1" and a relationship of "WAS" to "OS2" are created. In this case, the constraint expression self.host=self.resolve("/JDBC").host is operated, which defines that WAS and JDBC should be hosted by the same OS. However, a result returned by operating this expression is false. Namely, the software units WAS and JDBC are not hosted on the same operation system actually. The desired result in this case is that "JDBC" and "WAS" should be hosted on the same operation system. Thus, the above prior art verification cannot obtain the above result, either.

In fact, during verifying the instance model by applying constraint on the model, when the instance model has false, failure will occurs in the constraint applied thereon. The occurring constraint failures may be of two types: one is null node failure, that is, a return value of some node of the applied constraint is zero which indicates that the node is a null node (e.g. not defined); another is logic failure, that is, a return value of some node of the applied constraint is a wrong value which means that there is an error in the logic generating this node value.

However, the verification to an instance model in the prior art can only give verification result of "True" or "False" to the model user without providing the root cause of the model failures that the user wants to know.

If the user wants to check out the specific cause of the occurring failures, he is required to know the details of the above standard model and respective expressions therein, which is very difficult for the model user.

SUMMARY

With respect to the above problems, the present invention provides a method and device for a pattern based constraint violation analysis for identifying a root cause at main domain level.

According to an aspect of the invention, a method of performing a constraint failure analysis on an instance model is provided, comprising steps of: defining multiple patterns for a constraint of a standard model, said multiple patterns containing a navigation pattern and a logic pattern; deciding whether there is a null node in a constraint evaluation tree generated by the instance model; performing a failure analysis on the constraint evaluation tree based on the navigation pattern if there is a null node☐and performing the failure analysis on the constraint evaluation tree based on the logic pattern if there is no null node.

In an embodiment of the invention, there is a further step of resolving said pattern into a pattern parsing tree, and sequentially comparing respective nodes in said constraint evaluation tree to all nodes in said pattern in the same order to find one or more matching patterns.

In an embodiment of the invention, the nodes in the constraint evaluation tree is annotated with a pattern identifier, and the method further comprises a step of selecting one or more matching patterns from said patterns according to said pattern identifier.

In an embodiment of the invention, said matching indicates that the type or the numerical values of the nodes in the constraint evaluation tree is identical to that of the corresponding node in the pattern parsing tree.

In an embodiment of the invention, there is a further step of selecting a most approximate matching pattern from the matching multiple patterns, said most approximate matching pattern being a pattern with the most nodes that match the constraint evaluation tree.

In an embodiment of the invention, there is a further step of extracting a parameter item and/or a description item for describing a root cause of the constrain violation from the most approximate matching pattern to generate a problem cause report.

In an embodiment of the invention, said logic pattern has multiple levels, and the method further comprises a step of obtaining a logic pattern of a currently available level and sequentially comparing all nodes in the obtained logic pattern of the currently available level and a logic pattern of its lower-level with respective nodes in said constraint evaluation tree.

In an embodiment of the invention, said navigation pattern is used to define paths between respective units in the standard model, and the logic pattern is used to define logic relationship between the navigation patterns.

According to another aspect of the invention, a device for performing a constraint failure analysis on an instance model is provided, comprising: an analysis decider for deciding whether there is a null node in a constraint evaluation tree generated by the instance model; and a failure analyzer for performing a failure analysis on the constraint evaluation tree based on a navigation pattern if there is a null node, and performing the failure analysis on the constraint evaluation tree based on a logic pattern if there is no null node.

In an embodiment of the invention, a constraint pattern definer is further comprised for defining multiple patterns for a constraint of a model, said multiple patterns containing the navigation pattern and the logic pattern, wherein said navigation pattern is used to define paths between respective units in the model, and the logic pattern is used to define logic relationship between the navigation patterns.

In an embodiment of the invention, a pattern parser is further comprised for resolving said pattern into a pattern parsing tree, and wherein said failure analyzer sequentially compares respective nodes in said constraint evaluation tree with all nodes in said pattern in the same order to find one or more matching patterns.

In an embodiment of the invention, the node in the constraint evaluation tree is annotated with a pattern identifier, and said analysis decider selects one or more matching patterns from said patterns according to said pattern identifier.

In an embodiment of the invention, said matching indicates that a type or a numerical value of the node in the constraint evaluation tree is identical to that of the corresponding node in the pattern parsing tree.

In an embodiment of the invention, said failure analyzer selects a most approximate matching pattern from the matching multiple patterns, said most approximate matching pattern being a pattern with the most nodes that match the constraint evaluation tree.

In an embodiment of the invention, a problem cause reporter is further comprised for extracting a parameter item and/or a description item for describing a root cause of the constraint violation from the most approximate matching pattern to generate a problem cause report.

In an embodiment of the invention, said logic pattern has multiple levels, and said failure analyzer obtains a logic pattern of a currently available level and sequentially compares all nodes in the obtained logic pattern of the currently available level and a logic pattern of its lower-level with respective nodes in said constraint evaluation tree.

According to another aspect of the invention, a method of defining a constraint pattern is provided, comprising: defining multiple patterns for a constraint of a model; and resolving said multiple patterns into a logic pattern and/or a navigation pattern, wherein said navigation pattern is used to define paths between respective units in the model, and the logic pattern is used to define logic relationship between the navigation patterns.

In an embodiment of the invention, said logic pattern refers multiple navigation patterns.

In an embodiment of the invention, said logic pattern has multiple levels, and different logic patterns contain basic information with different details.

In an embodiment of the invention, said pattern contains a parameter item and/or a description item for describing a root cause of the constraint violation.

The present invention provides a convenient tool to bridge a model-constraint designer and a model user, reduce load for model/constraint usability, simplify the learning curve, and assist to make a model correction for the model user. The invention can also enable automatically implementing the manual model integrity analysis process.

BRIEF DESCRIPTION OF THE DRAWINGS

These and/or other aspects and advantages of the invention will become more apparent and easily understood from the detailed description of the embodiments of the invention in conjunction with following figures, in which.

DETAILED DESCRIPTION OF THE INVENTION

Figure 1:
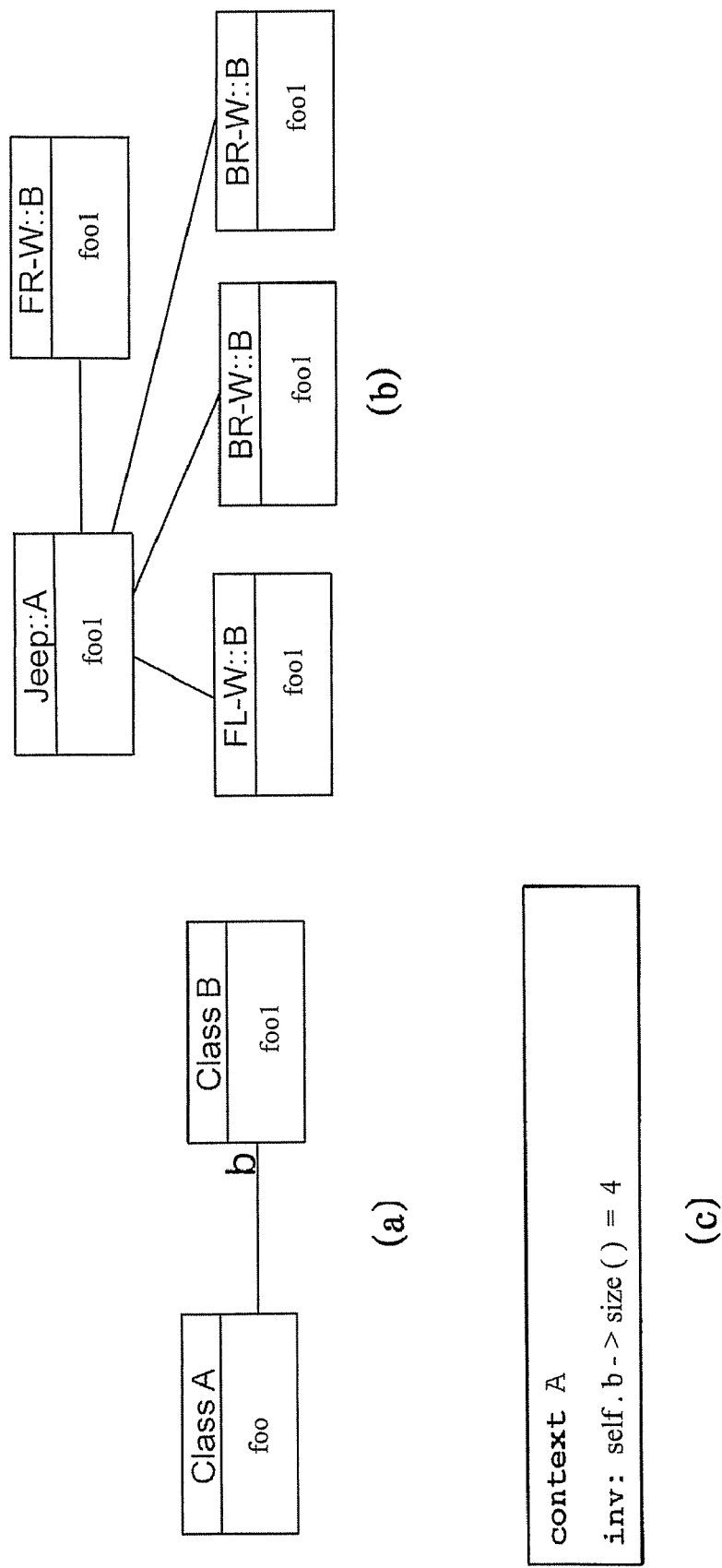
FIGS. 1(a), (b) and (c) are graphic representations of standard model.
Figure 2:
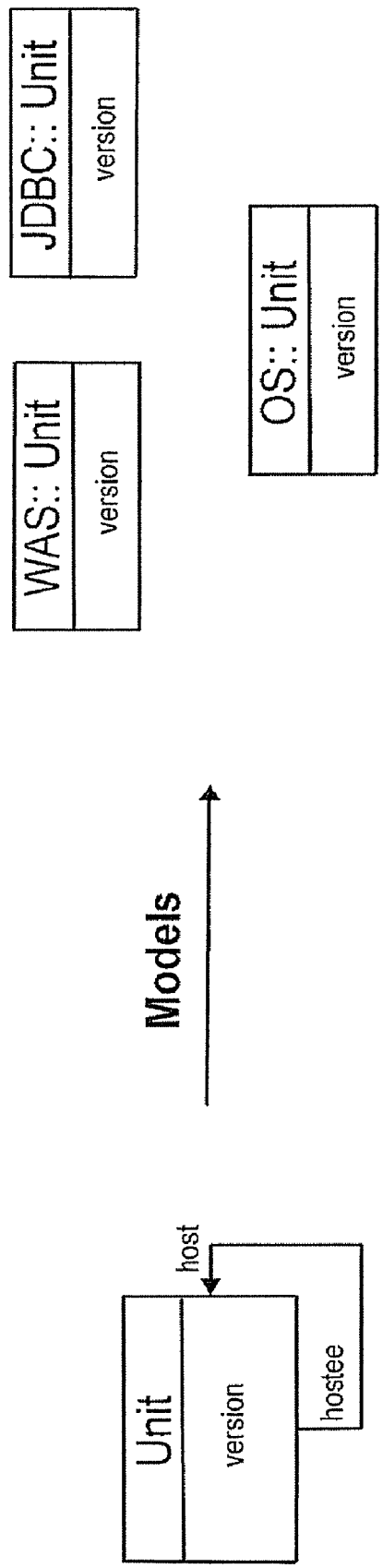
FIG. 2 is an example of process for creating a standard model in the prior art.
Figure 3:
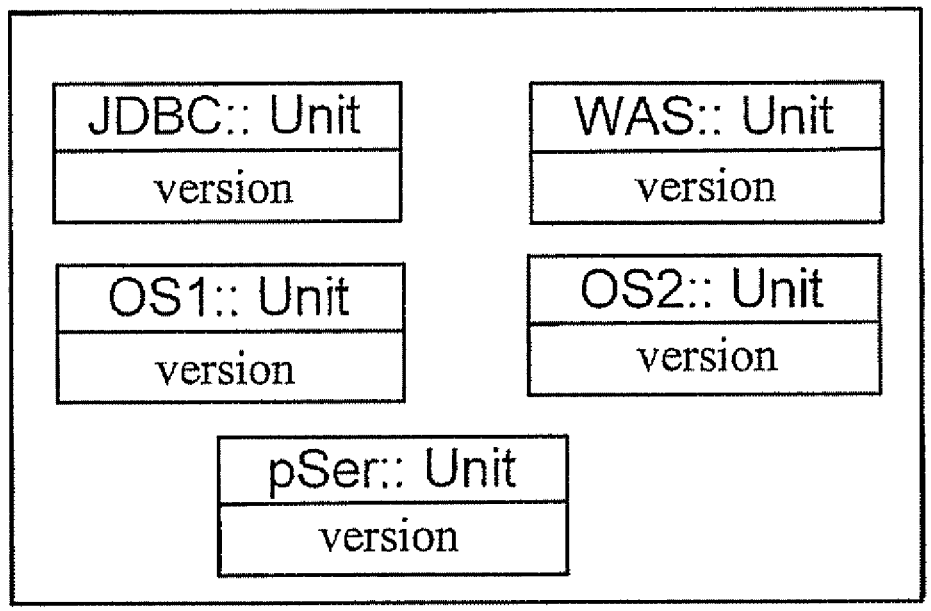
FIG. 3 is an example of the created instance model.
Figure 4:
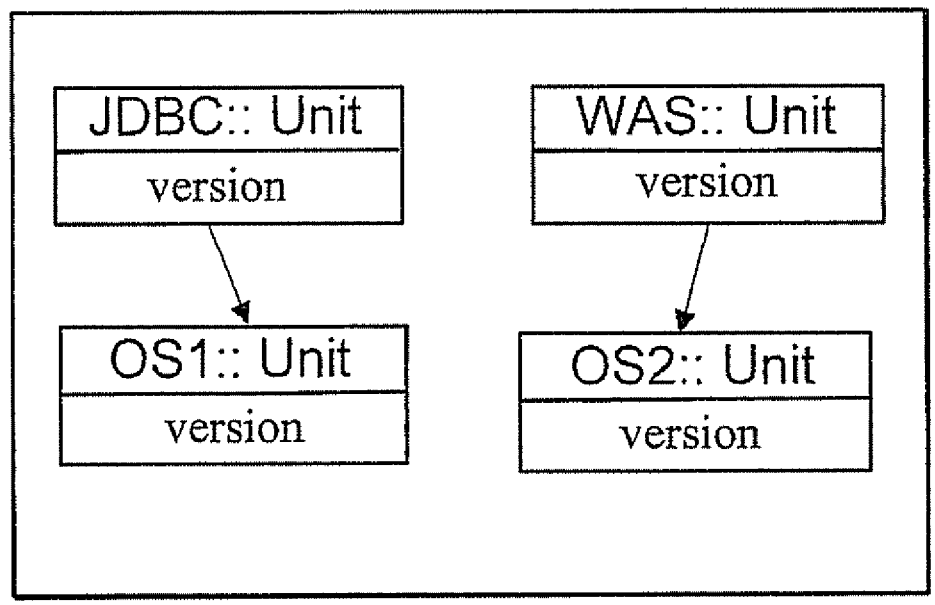
FIG. 4 is another example of the created instance model.

Specific embodiments of the invention will be described in detail with respect to figures below. Taking into account that detailed description of some related art would confuse the present invention, the detailed description thereof will not be provided herein. In the same embodiment, the same reference numerals are used to indicate the same elements or components performing the same functions.

Figure 5:
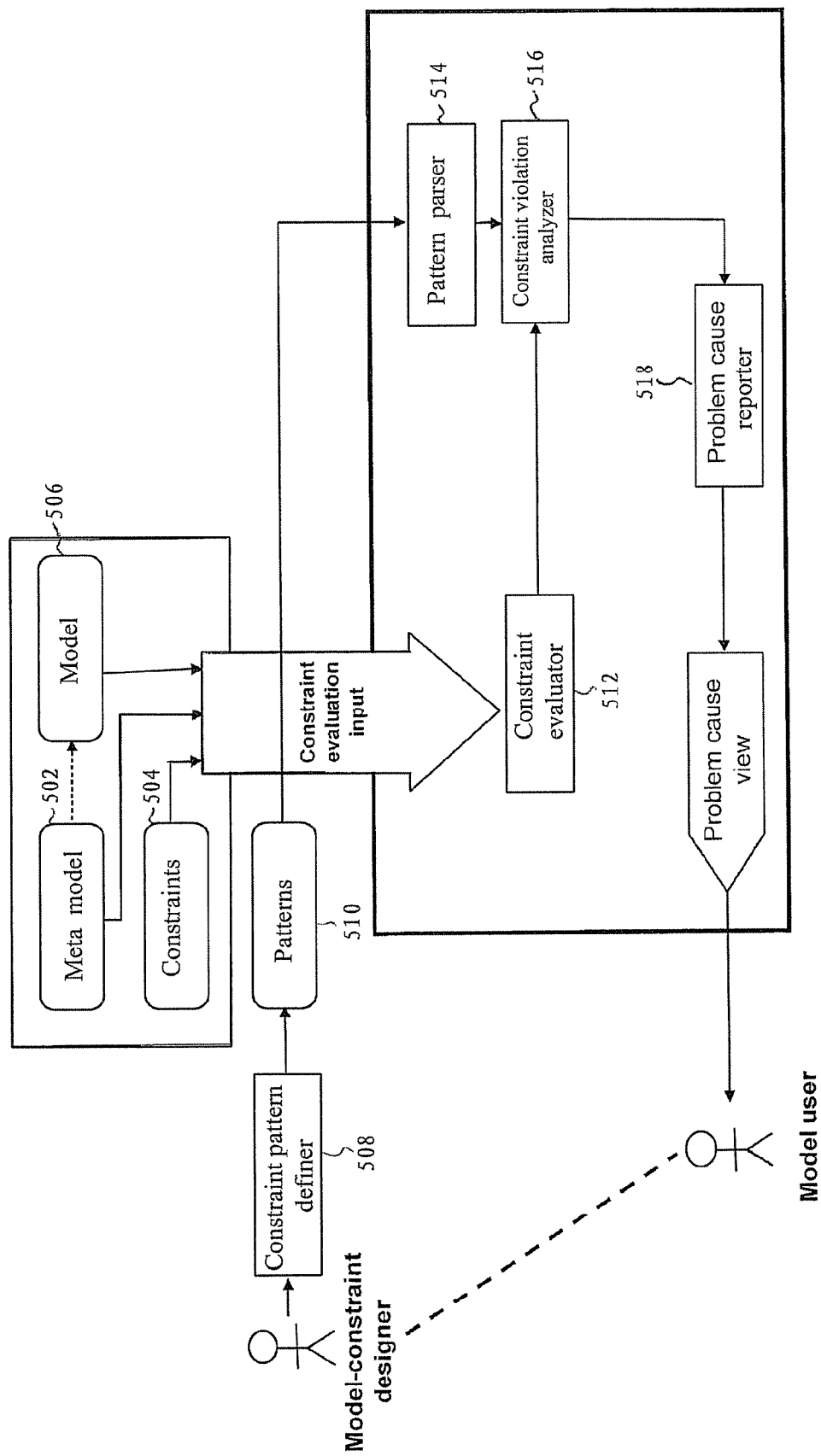
FIG. 5 is an example showing the general concept of the invention.

FIG. 5 is a view showing the general concept of the invention.

In FIG. 5, a standard model 502 that has been designed by a model-constraint designer and a constraint 504 attached thereto, and an instance model 506 created by the model user based on the standard model 502 are included. The above standard model 502, constraint 504 and instance model 506 are input to the constraint evaluator 512 as constraint evaluation input. In the constraint evaluator 512, the instance model 506 is resolved according to the standard model 502 and the constraint condition 504 to form a constraint evaluation tree (in which basic elements in the constraint are represented with a tree structure), and the result is then sent to a constraint violation analyzer 516.

The model-constraint designer constructs a constraint pattern definer 508 in which multiple patterns (which will be described in detail below) 510 are defined for each constraint. In particular, the constraint pattern definer 508 represents the constraint of the standard model as a logic expression, and defines the logic expression as multiple constraint patterns which may be classified as a logic pattern and a navigation pattern, in which the navigation pattern defines paths among respective unit in the standard model, and the logic pattern defines the logic relationships among the navigation patterns.

Then, the constraint pattern definer 508 sends each of the defined patterns to the pattern parser 514, in which each pattern is resolved to form the pattern parsing tree where basic elements in each pattern are represented with a tree structure. The result is then sent to the constraint violation analyzer 516.

In the constraint violation (failure) analyzer 516, a navigation failure analysis and/or a logic failure analysis are performed based on the provided pattern parsing tree and constraint evaluation tree, so as to find out the location of a failure in the constraint evaluation tree, find the pattern (the navigation pattern and the logic pattern) corresponding to the failure, extract corresponding pattern parameters, and send the found corresponding failure pattern and the extracted pattern parameters to a problem cause reporter 518.

In the problem cause reporter 518, a report on the problem cause is formed by using data such as the obtained failure pattern and pattern parameters and provided to the model user by means of, for example, video, audio, image, graphic, etc.

Figure 6:
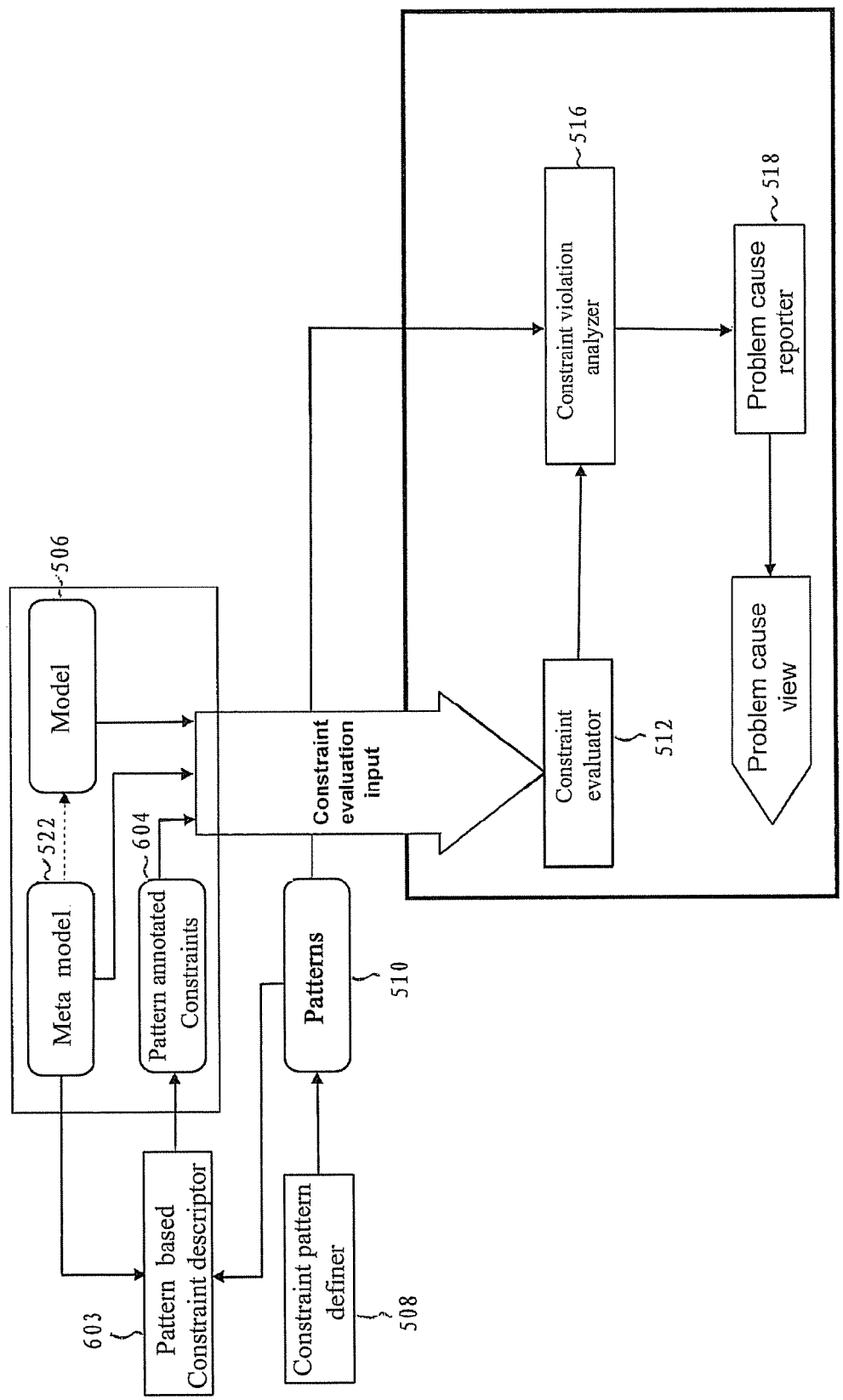
FIG. 6 is another example showing the general concept of the invention.

FIG. 6 is another example showing the general concept of the invention.

The embodiment as shown in FIG. 6 is different from that in FIG. 5 in that the pattern parser 514 is canceled from FIG. 5, the constraint 504 is replaced by a constraint 604 with pattern annotation, and a pattern based constraint describer 603 is added.

In the constraint pattern definer 508 of FIG. 6, multiple patterns 510 are defined for each constraint and sent to the pattern based constraint describer 603 and also directly sent to the constraint violation analyzer 516.

In the pattern based constraint describer 603, according to the received patterns 510 and the created standard model 502, the constraint is defined as follows: logic pattern denotation is firstly used to describe the skeleton of the constraint, and then its parameters will be defined with the navigation pattern. Each parameter is a path which is composed of navigation pattern. With such a pattern based constraint description mechanism, the constraint can be annotated with the structural pattern ID, i.e. the constraint is annotated with the structural pattern ID so the constraint corresponds to a particular pattern. Namely, the pattern based constraint describer 603 generates the constraint 604 with a pattern annotation in which the constraint is annotated with a structural pattern ID such that the constraint corresponds to a particular pattern, based on the standard model 502 and the constraint pattern received from the constraint pattern definer 508. A relationship is created between the constraint and the pattern with the pattern ID so that a corresponding pattern may be found from the particular constraint by the pattern ID.

Then, the constraint represented by reference numeral 604 is different from that represented by reference numeral 504 in FIG. 5. The constraint represented by reference numeral 604 is a constraint with an attached pattern annotation, that is, a corresponding pattern can be found through the annotation to the constraint.

Thus, in the embodiment of FIG. 6, the standard model 502, the constraint 604 with a pattern annotation, and the instance model 506 are input to the constraint evaluator 512 as the constraint evaluation input. In the constraint evaluator 512, the instance model 506 is resolved according to the standard model 502 and the constraint with the pattern annotation to form a constraint evaluation tree with the pattern annotation. Each unit (node) in the constraint evaluation tree has a pattern ID to correspond to a corresponding pattern. The result is then sent to a constraint violation analyzer 516.

Figure 13:
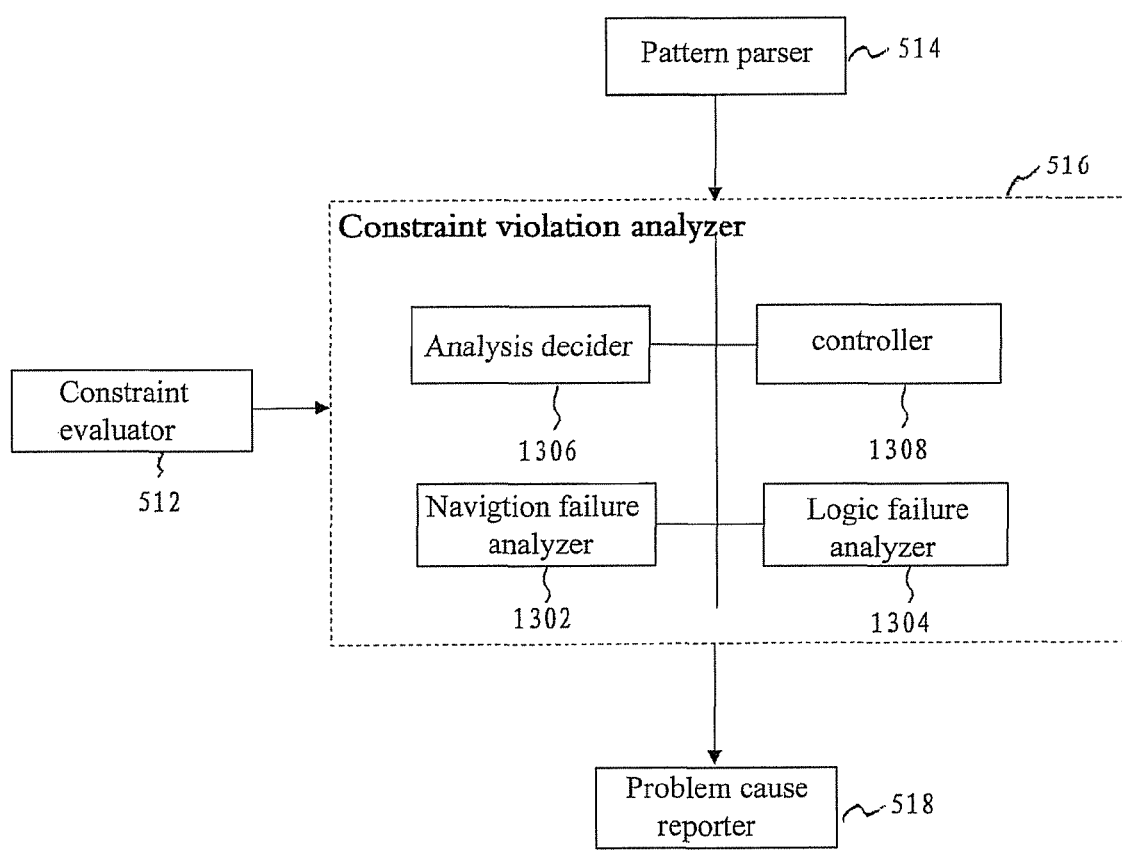
FIG. 13 is a block diagram of a constraint violation analyzer according to an embodiment of the invention.

In the constraint violation analyzer 516, a failure analysis is performed based on the provided pattern 510 and the constraint evaluation tree with the annotation provided from the constraint evaluator 512. Namely, the node (location) where the failure is located is found by traversing each node in the constraint evaluation tree (analysis deciding means as shown in FIG. 13), the pattern (the navigation pattern and the logic pattern) corresponding to the failure is found among patterns 510 according to the found failure node and its pattern ID, then corresponding pattern parameters are extracted from the found pattern corresponding to the failure, and the found failure pattern and the extracted pattern parameters are sent to the problem cause reporter 518.

In the problem cause reporter 518, a report on the problem cause is formed by using data such as the obtained failure pattern and pattern parameters and provided to the model user by means of, for example, video, audio, image, graphic, etc.

All of the above constraint evaluator 512, pattern parser 514 and problem cause reporter 518 can be implemented by those skilled in the art with known existing technique.

Figure 7:
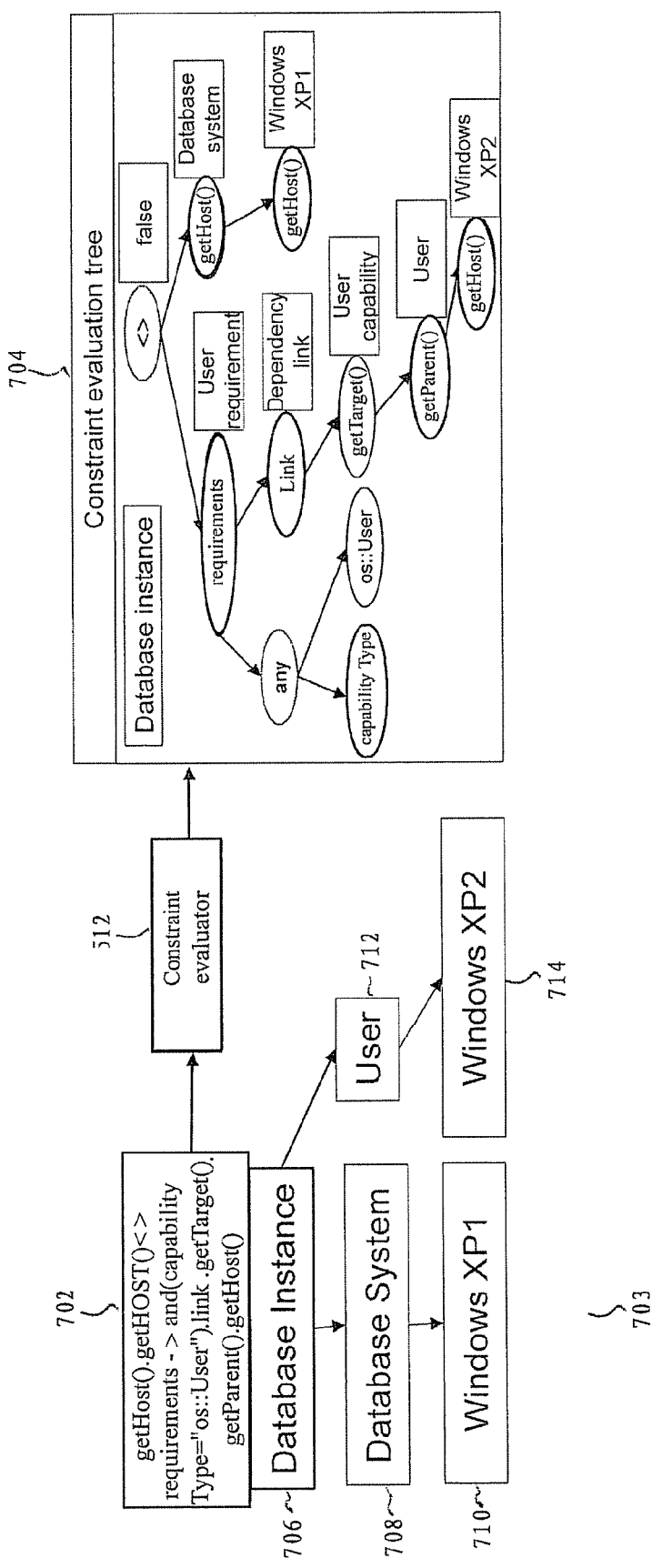
FIG. 7 is a view showing an example of function of a constraint evaluator and structure of a constraint evaluation tree in the prior art.

FIG. 7 is a view showing an example of function of a constraint evaluator and structure of a constraint evaluation tree in the prior art.

As shown in FIG. 7, the reference numeral 703 indicates an instance model, which means that the database instance 706 is an instance of a database system 708 and is hosted on the operation system Windows XP1, while a user application 712 operating on the database instance 706 runs on the operation system Windows XP2. The reference numeral 702 refers to a constraint to the instance model 703 which means that the database instance 706 and the user application 712 operating thereon should be hosted (mounted) on the same operation system.

The constraint evaluator 512 compiles the constraint 702 and resolves the instance model 703 into a constraint evaluation tree 704 on the right of FIG. 7 which includes each element in the constraint 702, in accordance with the constraint 702. By operating respective nodes on both sides of logic operator "< >", respectively, a logic operating value of "false" is obtained Namely, since the data instance 706 is hosted on the operation system Windows XP1 while the user application 712 operating on the database instance 706 is hosted on the operation system Windows XP2, which does not comply with requirement of the constraint 702 (the database instance 706 and the user application 712 operating thereon should be hosted (mounted) on the same operation system), and thus its logic operating value is false.

Main function of the above constraint evaluator 512 is to perform accidence, syntax and semantic analysis by using the existing compiling techniques to calculate an evaluation result of the constraint. Since the compiling techniques are well known to those skilled in the art, they will not be described in the invention.

Figure 8:
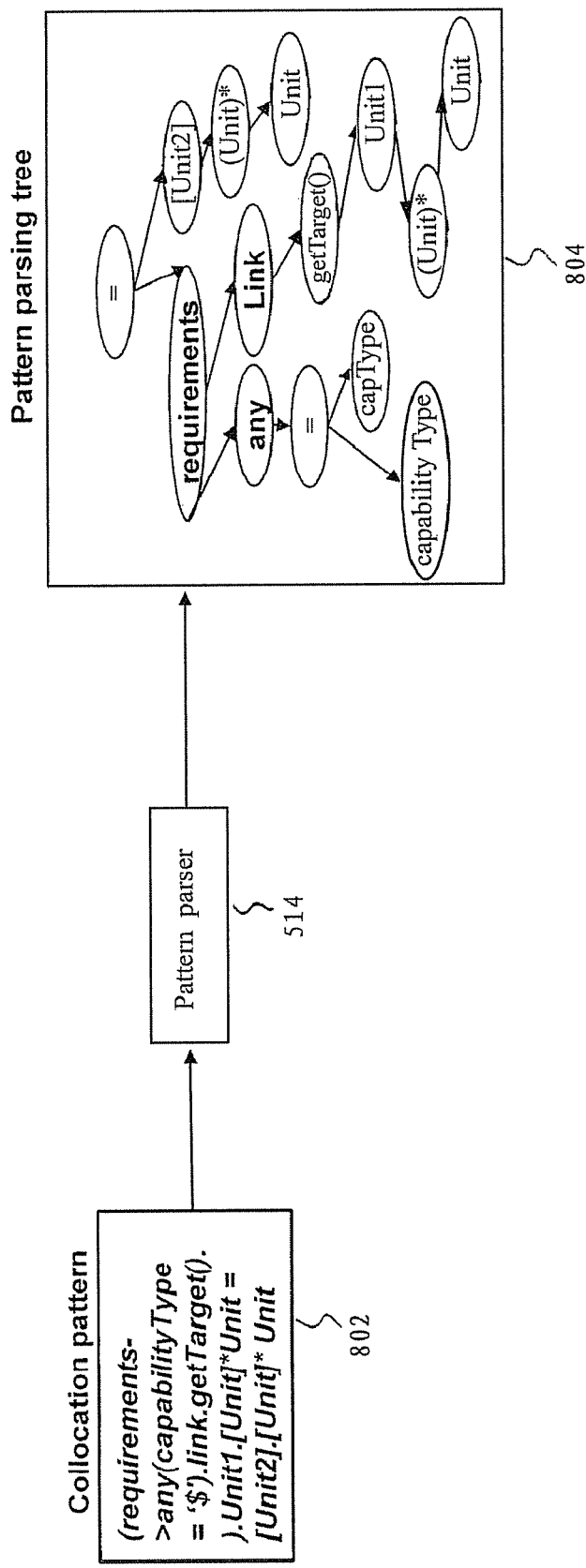
FIG. 8 is a view showing an example of function of a pattern parser and structure of the pattern parsing tree in the prior art.

FIG. 8 is a view showing an example of function of a pattern parser 514 and structure of the pattern parsing tree in the prior art.

As shown in FIG. 8, the pattern parser 514 compiles a collocation pattern 802 to resolve it into a pattern parsing tree 804 on the right of FIG. 8 which includes each element in the pattern 802. The pattern parsing tree 804 includes the navigation pattern and/or the logic pattern. Since the pattern parser 514 mainly uses the existing compiling techniques to perform accidence, syntax and semantic analysis on the constraint pattern for creating a pattern parsing tree, the detailed description thereof will be omitted so as not to confuse the invention.

Figure 9:
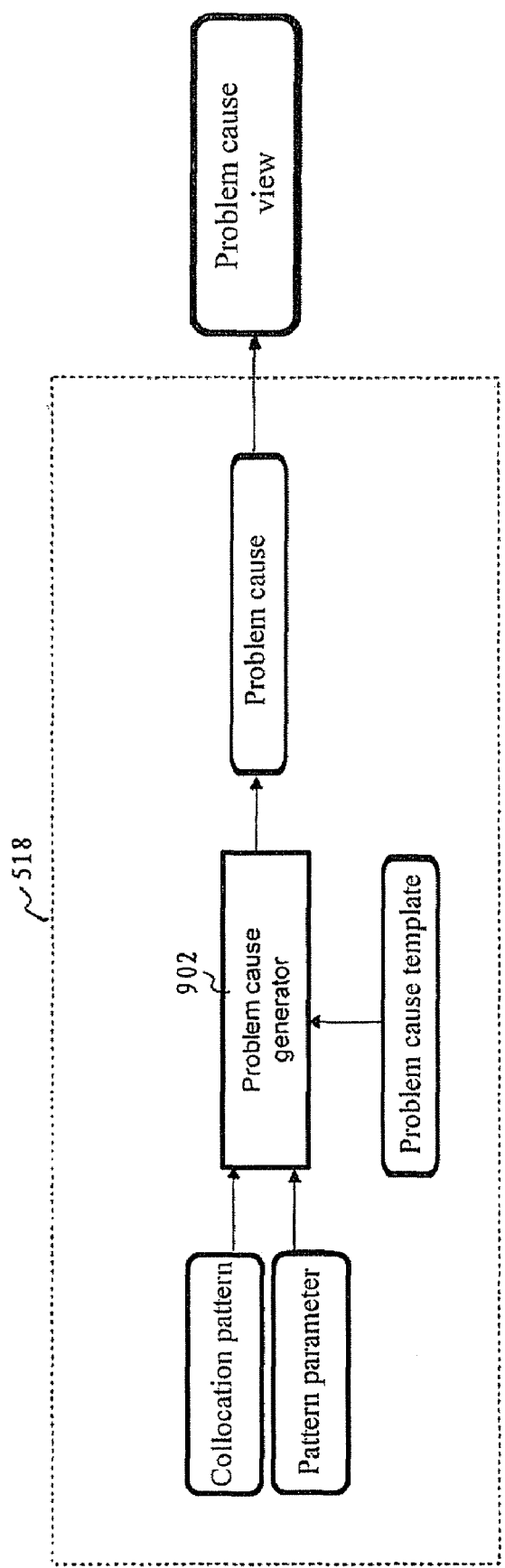
FIG. 9 is a view showing an example of function of a problem cause reporter in the prior art.

FIG. 9 is a view showing an example of the function of the problem cause reporter 518 in the prior art.

As shown in FIG. 9, the problem cause reporter 518 includes problem cause generators 902 and 904 which receive the obtained failure pattern and the extracted pattern parameters from the constrain violation analyzer 516 to form a report on the problem cause, and present the report to the model user.

The problem cause reporter 518 constructs a problem cause of the constraint violation by using a parameter filling technique according to results of the constraint violation analysis. Since it is a simple and direct existing art and is well known to those skilled in the art, the detailed description thereof will be omitted so as not to confuse the invention.

Below, a method and device for defining a constraint pattern in the invention will be described.

As described above, in an embodiment of the invention, the constraint pattern definer 508 represents a constraint of a standard model as a logic expression, and defines the logic expression as multiple constraint patterns comprising two classes of the logic pattern and the navigation pattern, in which the navigation pattern defines paths among respective units in the standard model, and the logic pattern defines the logic relationships among the navigation patterns.

Figure 10:
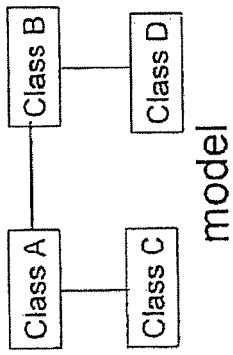
FIG. 10 is a view for defining a navigation pattern in an embodiment of the invention.

FIG. 10 is a view for defining a navigation pattern in an embodiment of the invention.

A model as shown in FIG. 10 is created which includes Class A, Class B, Class C and Class D. In order to locate from Class A to Class D, a path from Class A through Class B to Class D is expressed by a constraint expression "A.B.D". "A.B.D" is a semantic unit to represent the path from Class A to Class D, and such a constraint expression is defined as a navigation pattern. In constraint violation analysis, the above navigation pattern may be handled as a whole.

Figure 11:
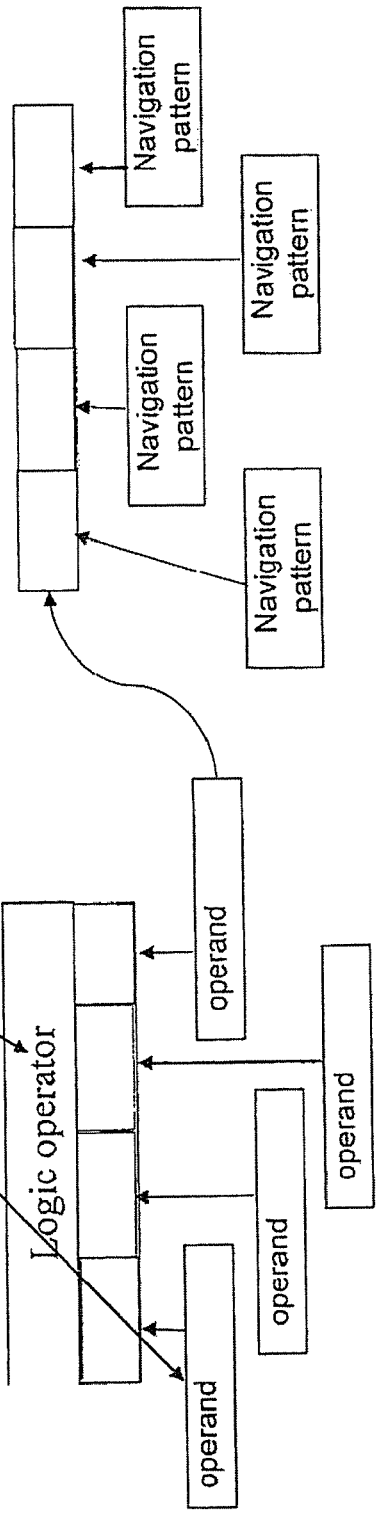
FIG. 11 is a view for defining a logic pattern in an embodiment of the invention.

FIG. 11 is a view for defining a logic pattern in an embodiment of the invention.

In an embodiment of the invention, a constraint condition expression such as "self.host=self.resolve("/JDBC").host" shown in FIG. 11 is defined as a logic pattern where the notation "=" means a logic operator, "self.host" (namely the navigation pattern defined above) indicates a operand. In an embodiment of the invention, a pattern parsing tree may comprise multiple logic patterns each of which may include multiple operands, and each operand may refer multiple navigation patterns. The logic relationship is achieved with the logic operator, and the logic expression is described with an object constraint language (OCL).

In an embodiment of the invention, for each constraint pattern including the navigation pattern and the logic pattern, its basic information is defined as below:

ID, the unique information to identify the pattern;

Name, the informal summarized description for the pattern;

Description, the informal description information for the pattern;

Context, some parameters definition to record the evaluation context of the pattern;

Denotation, the formal representation for the pattern, it is a string information with parameters;

Problem Cause Template, the specific problem cause template will be defined with following items:

Parameters, the parameters will be used for the description of the problem cause, the values of these parameters will be obtained at the evaluation time; and Description, a string with parameters to describe the specific problem cause.

Figure 12:
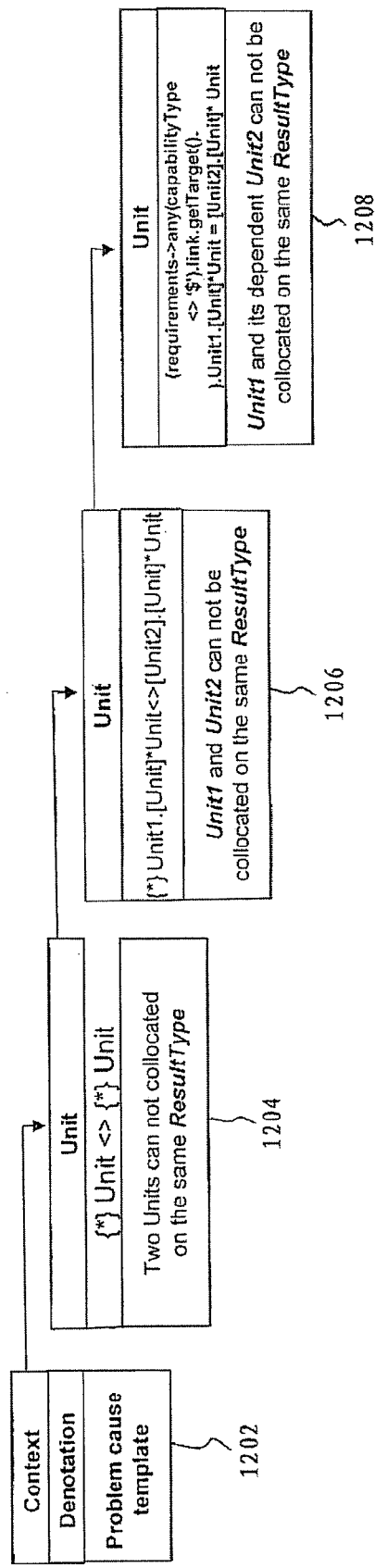
FIG. 12 is a view showing a collocation constraint pattern in an embodiment of the invention.

FIG. 12 is an example showing a collocation constraint pattern in an embodiment of the invention.

As shown in FIG. 12, the reference numeral 1202 indicates the basic information included in the constraint pattern: Context, Denotation and Problem-cause-template. This constraint pattern may be represented as different levels each has different amount of information. For example, the reference numeral 1204 indicates a first level which shows the least amount of information and its item "Problem-cause-template" may be "Two Units can not be collocated on the same ResultType"; the reference numeral 1206 indicates a second level which shows more amount of information than the first level, and its item "Problem-cause-template" may be "Unit 1 and Unit 2 can not be collocated on the same ResultType"; the reference numeral 1208 indicates a third level which shows still more amount of information than the second level, and its item "Problem-cause-template" may be "Unit1 and its dependent Unit2 can not be collocated on the same ResultType".

The more amount of information the above constraint pattern contains, the more amount of information the constraint violation analysis can provide, the more detailed the analysis will be, and the more explicit and specific the obtained cause of the constraint violation will be. Thus, in the constraint violation analysis described below, the analysis will be performed to the lowest level that has the most amount of information, level by level.

Hereinafter, the constraint violation analyzer 516 and its operations will be described with respect to the drawings.

FIG. 13 is a block diagram of the constraint violation analyzer according to an embodiment of the present invention.

According to FIG. 13, the constraint violation analyzer 516 of the invention includes a navigation failure analyzer 1302, a logic failure analyzer 1304, an analysis decider 1306, and a controller 1308.

As described previously, during verifying an instance model, the occurring constraint failures may be of two types: one is null node failure, that is, a return value of a certain node of the applied constraint is zero which indicates that the node is a null node; and another is logic failure, that is, a return value of a certain node of the applied constraint is a wrong value which means that there is an error in the logic operation generating this node value.

Thus, in the present invention, when verifying the instance model by applying a constraint to the model, if the returned verification value is not correct, a failure analysis may be performed by using the constraint violation analyzer of the invention as shown in FIG. 13.

In an embodiment of the invention, the analysis decider 1306 in the constraint violation analyzer 516 receives constraint evaluation information, which is a generated constraint evaluation tree, from the constraint evaluator 512 through an interface (not shown).

In an embodiment of the invention, the analysis decider 1306 in the constraint violation analyzer 516 receives pattern parsing information, which is a parsed and generated pattern parsing tree, from the constraint evaluator 512 through an interface (not shown).

In the constraint violation analyzer 516, the analysis decider 1306 traverses each node in the constraint evaluation tree to decide whether a null node is found (for example, the return value is zero). For example, in the model as shown in FIG. 10, it decides whether the node Class B can be found from the node Class A, namely deciding whether the expression "A.B" is correct. If a null node is found in the constraint evaluation tree, for example, the node Class B cannot be found from the node Class A, i.e.☐the node is a null node (e.g. the node Class B is undefined), then it decides that an error occurs in the expression "A.B". In this case, since the expression "A.B" corresponds to the navigation pattern, the controller 1308 in the constraint violation analyzer 516 will instruct the navigation failure analyzer 1302 to perform a navigation failure analysis.

If no null node is found in the constraint evaluation tree, namely the node Class B can be found from the node Class A and the expression "A.B" is correct, the navigation pattern corresponding to the expression "A.B" does not have an error. Of course, the above analysis also includes that the expressions "A.C" and "A.B.D" are correct, too. In this case, the occurring failure should be a logic failure, and the controller 1308 in the constraint violation analyzer 516 will instruct the logic failure analyzer 1304 to perform a logic failure analysis.

Operations of the navigation failure analyzer 1302 and the logic failure analyzer 1304 will be described in detail below.

The navigation failure analyzer 1302 and the logic failure analyzer 1304 provide respective analysis results (containing an obtained failure pattern and corresponding parameter values) to the problem cause reporter 518 in which a report for reporting the problem cause to the model user is formed.

The navigation failure analyzer 1302 and the logic failure analyzer 1304 of the invention do not construct limitation to the scope of the invention, and they can be combined in one device, for example, a failure analyzer to perform the functions of both the navigation failure analyzer 1302 and the logic failure analyzer 1304.

Figure 14:
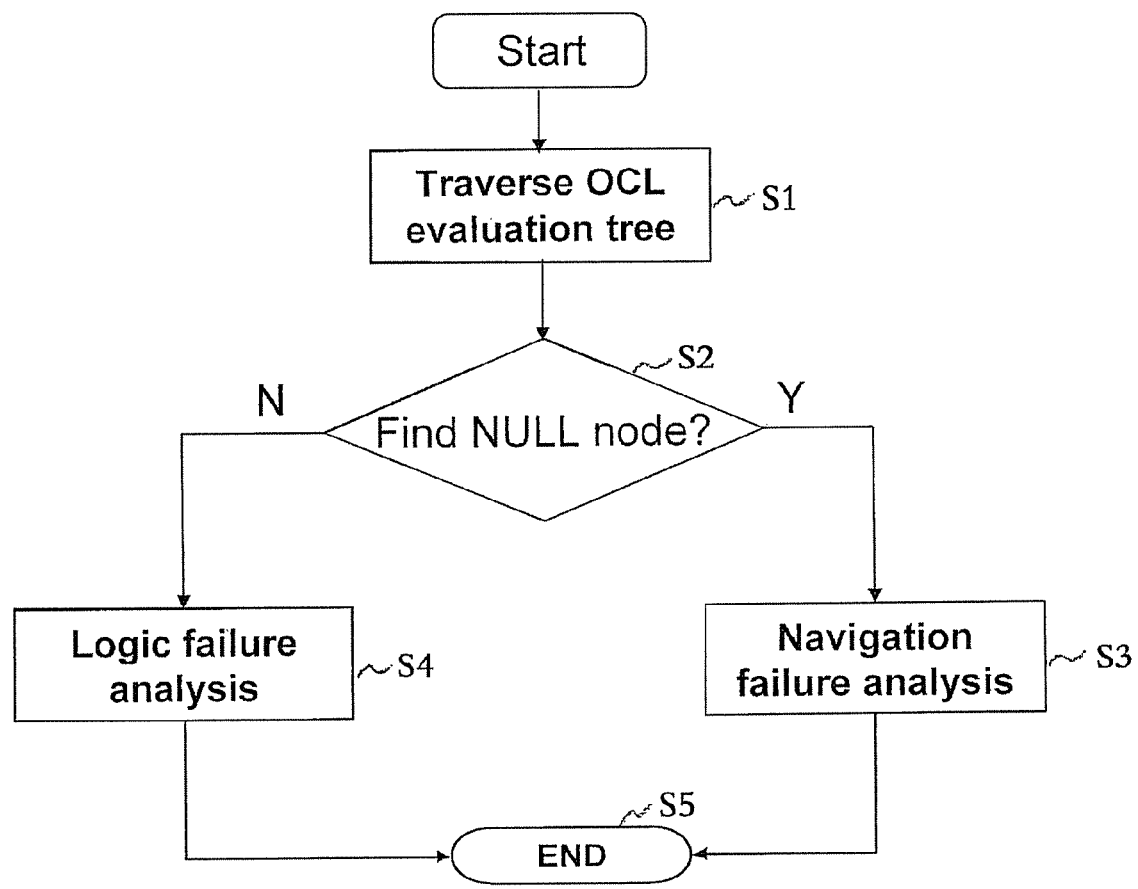
FIG. 14 is a flow chart of performing operations in the constraint violation analyzer according to an embodiment of the invention.

FIG. 14 is a flow chart of operations performed in a constraint violation analyzer according to an embodiment of the invention.

As shown in FIG. 14, in step S1, the analysis decider 1306 in the constraint violation analyzer 516 traverses respective nodes in the constraint evaluation tree.

Then, in step S2, the analysis decider 1306 decides whether a null node is found.

If a null node is found in the constraint evaluation tree, the navigation failure analyzer 1302 in the constraint violation analyzer 516 receives an instruction to perform the navigation failure analysis from the controller 1308 and perform the navigation failure analysis in step S3.

If no null node is found in the constraint evaluation tree, the logic failure analyzer 1304 receives an instruction to perform the logic failure analysis from the controller 1308 in the constraint violation analyzer 516 and perform the logic failure analysis in step S4.

Then in step S5, the problem cause reporter 518 receives respective analysis results from the navigation failure analyzer 1302 and/or the logic failure analyzer 1304, for example, the failure pattern and parameter values of the pattern, and forms a report for reporting the problem cause to the model user.

Hereinafter, respective operations of the constraint violation analyzer 516, the navigation failure analyzer 1302 and the logic failure analyzer 1304 therein, according to an embodiment of the invention will be described in detail.

Figure 15:
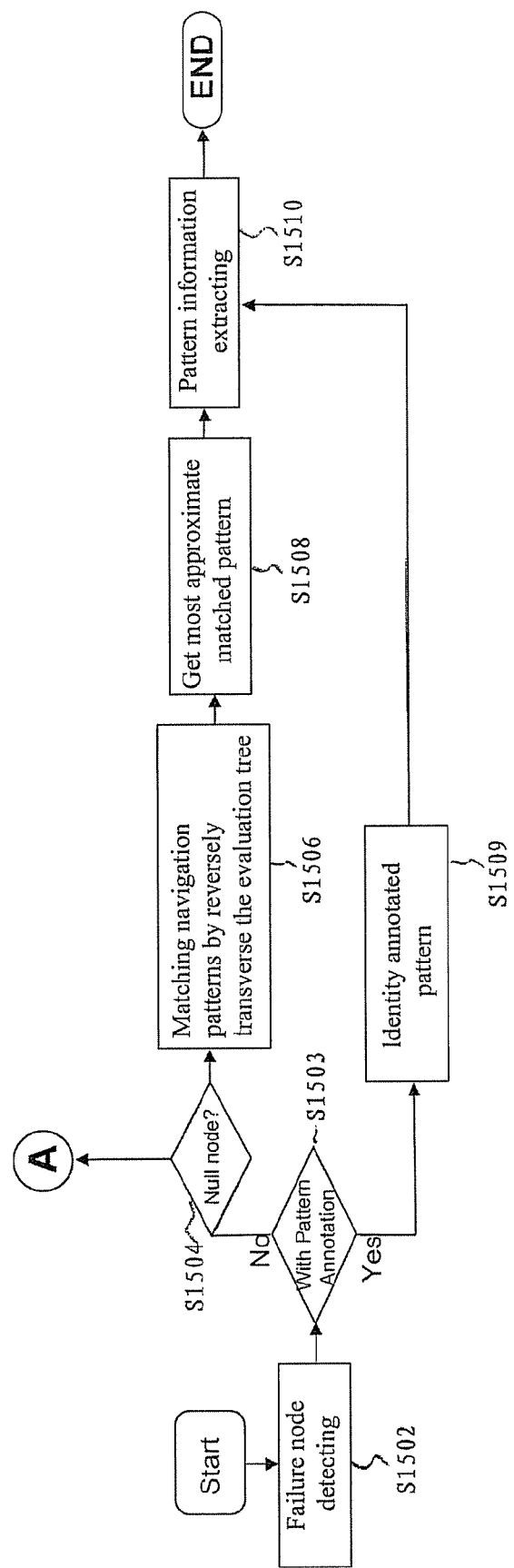
FIGS. 15 and 16 are views showing the operations of the constraint violation analyzer 516 in an embodiment of the invention.
Figure 16:
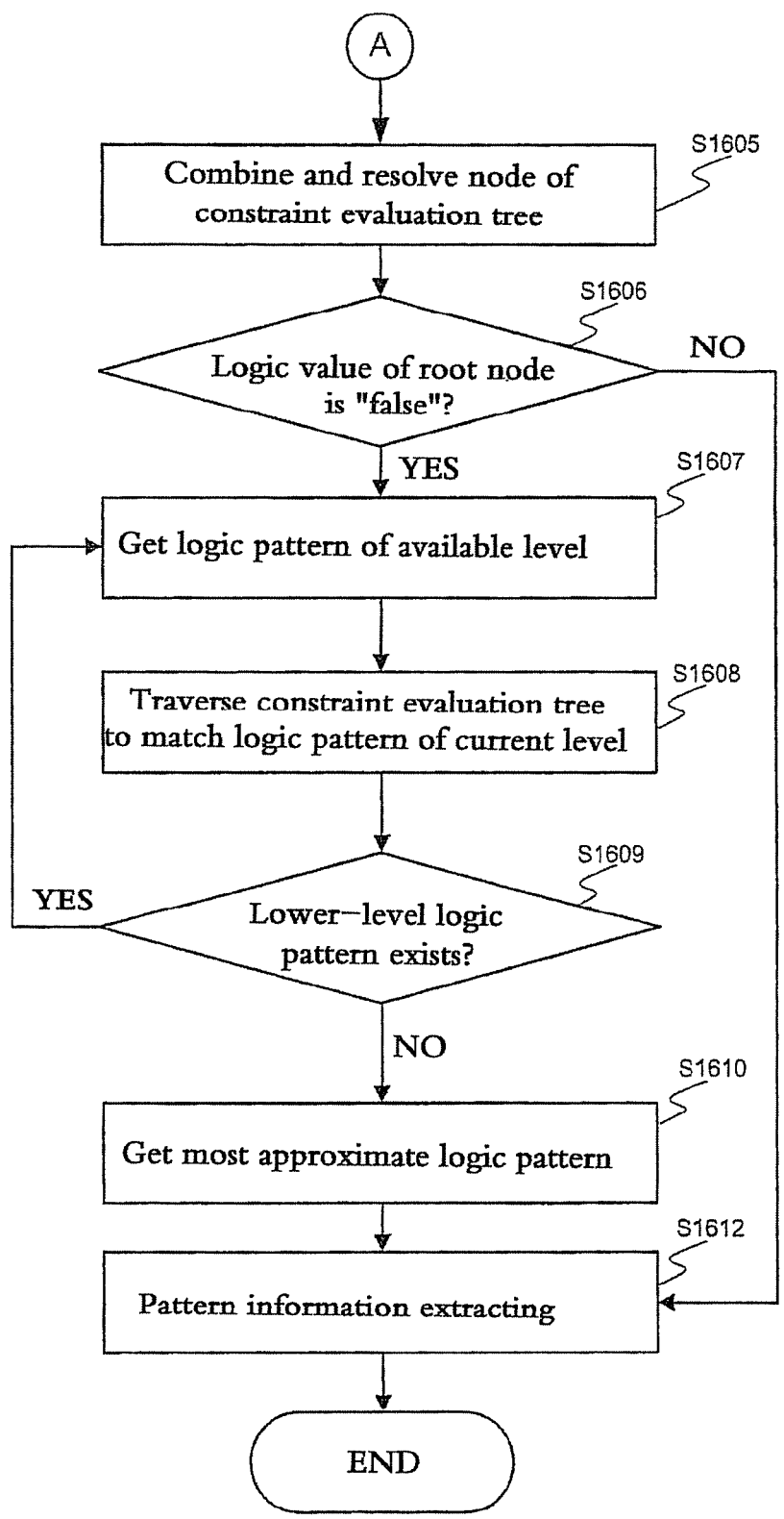

FIGS. 15 and 16 are flow charts showing the detailed operations of the constraint violation analyzer 516 in an embodiment of the invention.

As shown in FIG. 15, at step S1502, firstly, the constraint violation analyzer 516 perform failure code detection on the constraint evaluation tree received from the constraint evaluator 512 to detect whether it has a pattern annotation. The constraint violation analyzer 516 may include a separate failure code detector (not shown). Then, at step S1503, the failure code detector (not shown) decides whether there is a pattern annotation in the constraint evaluation tree.

If it is decided that there is no pattern annotation in the constraint evaluation tree at step S1503, the constraint violation analyzer 516 receives a pattern parsing tree from the pattern parser 514, and performs a navigation failure analysis and/or a logic failure analysis based on the constraint evaluation tree provided from the constraint evaluator 512 and the pattern parsing tree provided from the pattern parser 514.

Next, at step S1504, as described above with reference to FIGS. 13 and 14, the analysis decider 1306 in the constraint violation analyzer 516 traverses respective nodes in the constraint evaluation tree to decide whether a null node is found. If a null node is found in the constraint evaluation tree, it is indicated that an error (failure) occurs in the navigation, the controller 1308 in the constraint violation analyzer 516 will instruct the navigation failure analyzer 1302 to perform the navigation failure analysis.

Figure 17:
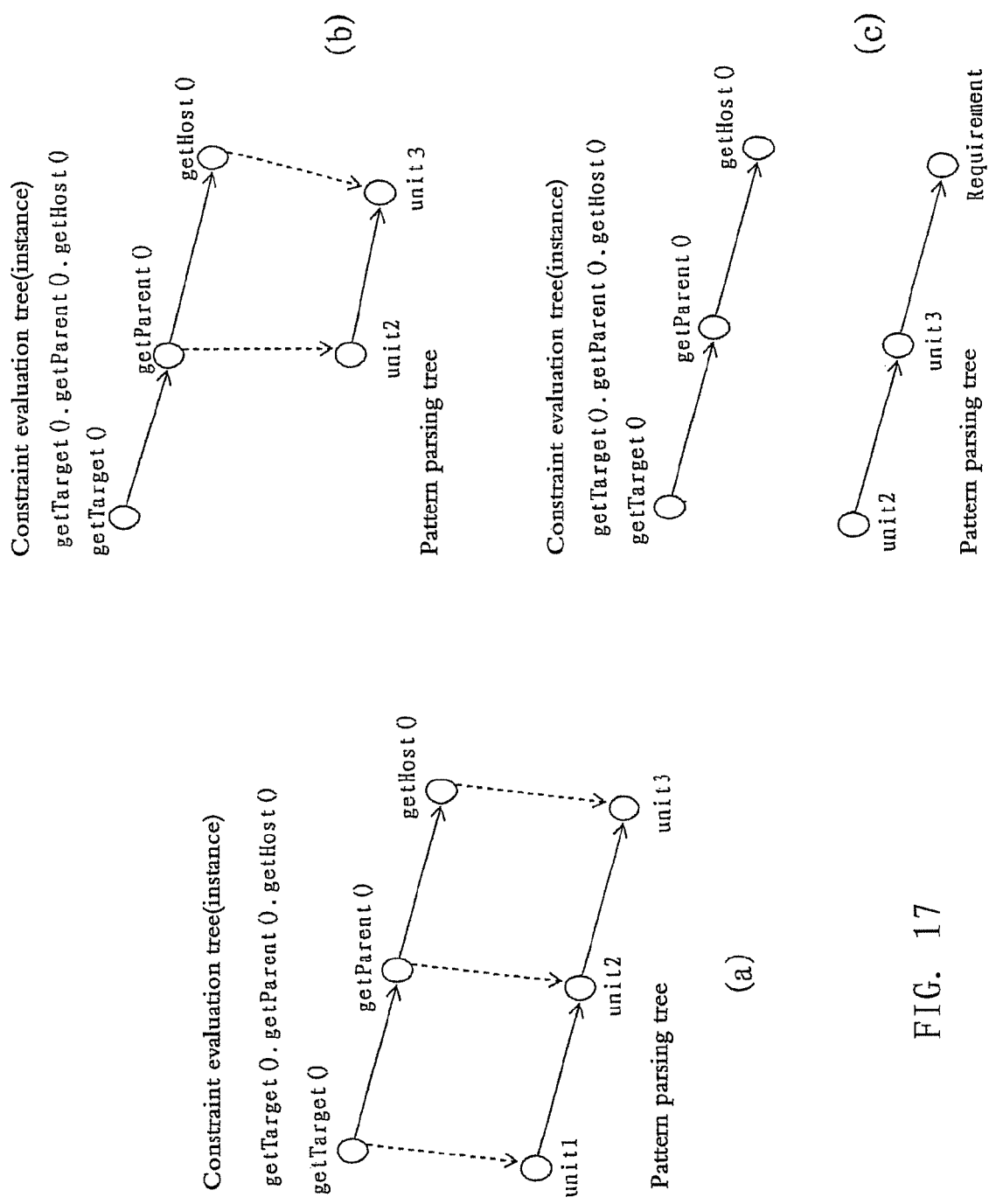
FIGS. 17(a), (b), and (c) are examples illustrating the finding of the navigation pattern (or logic pattern) matching to a failure node in a manner of traversing, in which a manner of reverse traversing is employed.

Next, in conjunction with FIG. 15 and FIGS. 17(*a*), (*b*) and (*c*), the navigation failure analysis is described.

As shown in step S1506 of FIG. 15, the navigation failure analyzer 1302 traverses respective nodes in the constraint evaluation tree to find out the navigation pattern matching the fail node. Methods of traversing each node in the constraint evaluation tree may be forward or backward, which are well known to those skilled in the art. Here, description is made to an example of the backward traverse.

FIGS. 17 (*a*), (*b*) and (*c*) are examples of finding the navigation pattern matching the fail node by way of traverse, in which the backward traverse is employed. As shown in FIG. 17(*a*), each node in the expression getTarget( ).getParent( ).getHost( ) is a part of the constraint evaluation tree, wherein one or more nodes are failure nodes. For clarity, in the present embodiment, the above several nodes are used as example to represent the constraint evaluation tree to perform the matching, in which the node getHost( ) is the last node of the constraint evaluation tree.

Each node (unit) in the expression unit1.unit2.unit3 is a part of the pattern parsing tress, and is used as one pattern to perform the matching in the present embodiment, wherein unit3 is the last node of the pattern.

In the above embodiment, from the last node, i.e. getHost( ), of the constraint evaluation tree and in order of from back to front, the navigation failure analyzer 1302 compares, for example, the type of a node therein to the type of each node in the same order in the pattern (parsing tree) in turn, in order to find the navigation pattern that matches it.

That is, the navigation failure analyzer traverses respective nodes in the constrain evaluation tree, and in order of from back to front or from front to back, compares the nodes therein to all nodes in the pattern parsing tree in the same order sequentially to find one or more navigation patterns that match it.

The term "match" as defined for the navigation pattern in the invention pattern means that the type of a node in the constraint evaluation tree is identical to the type of a corresponding node in the pattern. For example, if the type of the node getHost( ) in the constraint evaluation tree is identical to the type of the node unit3 in the pattern, then it is decided that the two nodes match each other. If the types are not identical, then they do not match. Of course, the above "type" does not construct limitation to the scope of the invention and another attribute may be defined to decide the matching.

As shown in FIG. 17(*a*), after deciding that the types of the node getHost( ) and the node unit3 are identical, it is decided whether the types of the node getParent( ) and the node unit2 are identical, and in turn, it is decided subsequently whether the types of the node getTarget( ) and the node unit1 are identical. In the above embodiment, if it is decided that the types of three pairs of nodes match, respectively, then a pattern unit1.unit2.unit3 is found which matches the constraint evaluation tree: getTarget( ).getParent( ).getHost( ). If any pair of the nodes therein does not match, then it is decided as not-matching.

As shown in FIG. 17(*b*), in case where the pattern parsing tree has, for example, two nodes unit2.unit3, it is decided at first whether the type of the node getHost( ) is identical to that of the node unit3, and then whether the type of the node getParent( ) is identical to that of the node unit2. In this embodiment, if it is decided that the types of the two pairs of nodes match, respectively, then a pattern unit2.unit3 is found which matches the constraint evaluation tree getTarget( ).getParent( ).getHost( ).

If any pair of the nodes therein does not match, then it is decided as not-matching.

As shown in FIG. 17(*c*), in a case where the pattern parsing tree has three nodes of unit2.Unit3.Requirement, it is decided at first whether the type of the node getHost( ) is identical to that of the node Requirement. In this embodiment, if it is decided that the types of this pair of nodes are not identical, then it is decided that the pattern unit2.Unit3.Requirement is not a pattern that matches the constraint evaluation tree get-Target( ).getParent( ).getHost( ).

In the invention, a same constraint evaluation tree may match multiple patterns. For example, in the above example, it may match two patterns. In the invention, each node in the constraint evaluation tree and all nodes of each pattern in the pattern parsing tree are compared sequentially in manner of backward or forward traverse, and if the types of all nodes of a certain pattern in the pattern parsing tree match those of each node in the constraint evaluation tree in the order of from back to front or from front to back, then it is decided that this pattern is a pattern that matches this constraint evaluation tree. In the invention, nodes in the constraint evaluation tree may be more than nodes in the pattern for performing the matching.

Next, at step S1508 of FIG. 15, the navigation failure analyzer 1302 selects a most approximate matching pattern from among all the matching patterns. In the invention, for example, a pattern with the most of the matching elements (nodes) may be set as the most approximate matching pattern. In the above embodiment, the matching patterns are the unit1.unit2.unit3 and the unit2.unit3 respectively, and according to the criteria set above, since the pattern unit1.unit2.unit3 contains three elements, all of which match corresponding nodes in the constraint evaluation tree, and the number of elements (3) therein is more than that of the pattern unit2.unit3 (2), the pattern unit1.unit2.unit3 is selected as the most approximate matching pattern. Namely, the most approximate matching pattern which the navigation failure analyzer selects from among the multiple matching navigation patterns has the most nodes that match the constraint evaluation tree.

Next, in step S1510, the navigation failure analyzer 1302 (a pattern information extractor (not shown) therein or connected thereto) extracts the relevant information, namely pattern parameter, from the selected, most approximate matching pattern. As described above, the invention defines the following basic information for a pattern: ID, Name, Description, Context, Denotation, Problem Cause Template, and so on, in which the Problem Cause Template has Parameters and Description for describing the problem cause. In the present embodiment, the relevant information extracted by the navigation failure analyzer 1302 may be the values of the Parameters in the above Problem Cause Template, and may also comprise values of other basic information.

After completing the above operations, as described previously, the navigation failure analyzer 1302 (a pattern information extractor therein or connected thereto) provides the obtained failure pattern and the extracted relevant information to the problem cause reporter 518, in which a report on the cause of the occurring problem is formed based on the provided failure pattern and the relevant information and is presented to the model user.

Next, the logic failure analysis will be described with respect to FIGS. 15, 16, 17(a), (b) and (c).

As described above, at the step S1504 of FIG. 15, the analysis decider 1306 in the constraint violation analyzer 516 traverses respective nodes of the constraint evaluation tree and decides whether a null node is found. If no null node is found in the constraint evaluation tree, it is indicated that no failure occurs in the navigation, and the occurring failure should be a logic failure. The controller 1308 in the constraint violation analyzer 516 will instruct the logic failure analyzer 1304 to perform the logic failure analysis. The process proceeds to the step S1605 in FIG. 16.

At the step S1605 in FIG. 16, the logic failure analyzer 1304 combines and/or resolves respective nodes in the constraint evaluation tree, for example, combines two and more elements therein into one element or resolves one element into two or more elements, so as to obtain the values of the corresponding nodes and calculate a logic value of the root node. For example, in the constraint evaluation tree shown in FIG. 7, the elements "getHost( )" and "getParent( )" may be combined into one element "getParent( )", and also, the element "getParent( )" may be resolved into two elements "getHost( )" and "getParent( )", that is, the element "getParent( )" may contain the element "getHost( )".

Then, as shown at the step S1606 of FIG. 16, the logic failure analyzer 1304 decides whether the logic value of the root node of the constraint evaluation tree is "true" or "false". If it is "true", there is no failure, and the process may be ended after the relevant operations. In case of constraint failure occurring, the deciding result must be "false".

If the logic value is "false", the process proceeds to the step S1607.

At the step S1607, the logic failure analyzer 1304 obtains a logic pattern with respect to a currently available level of the combined or resolved constraint evaluation tree, which may be the logic pattern of one level of the first to fourth levels as shown in FIG. 12, for example. Then, the process proceeds to the step S1608.

At the step S1608, the logic failure analyzer 1304 traverses respective nodes in the combined and/or resolved constraint evaluation tree according to the obtained logic pattern of the currently available level, in order to find the logic pattern corresponding thereto.

For example, if the logic pattern of the currently available level is the logic pattern of the second level indicated by 1204 as shown in FIG. 12, the logic failure analyzer 1304 traverses respective nodes in the constraint evaluation tree to find the logic pattern in the second level 1204 matching thereto. Namely, if the logic value of the root node is "false", the logic failure analyzer traverses respective nodes in the constraint evaluation tree, and compares sequentially the nodes therein to all nodes in the logic pattern of the currently available level in the same order of from back to front or from front to back, so as to find one or more logic patterns matching thereto.

The term "match" as defined for the logic patterns in the invention may indicate that numerical value of each node in the constraint evaluation tree is identical to that of the corresponding nodes in the pattern parsing tree. If the numerical values are identical, it is decided that the constraint evaluation tree matches the logic pattern. If their numerical values are different, they do not match. Of course, the above "numerical value" does not construct limitation to the scope of the invention, and other attributes may be defined to decide whether they match.

In the logic failure analyzer 1304, operations of traversing the constraint evaluation tree and deciding the matching with the logic patterns are the same as those in the navigation failure analyzer 1302. In order to describe the matching operation in the logic failure analyzer 1304, the type of the nodes of the navigation pattern in FIGS. 17(a), (b) and (c) may be substituted with the numerical value of the corresponding nodes. The condition for reaching the match is similar, that is, as long as the numerical value of a node in the constraint evaluation tree is identical to that of a corresponding node in the logic pattern, they are decided as matching each other. Specifically, in the logic failure analyzer 1304, respective nodes in the constraint evaluation tree are compared sequentially to all nodes of each logic pattern on the corresponding level in the pattern parsing tree in manner of backward or forward traverse. If all nodes of the some logic patterns in the pattern parsing tree are identical in numerical value to the respective nodes in the constraint evaluation tree in turn from back to front or from front to back, it is decided that the logic pattern is a logic pattern that matches the constraint evaluation tree.

In the invention, the number of nodes in the constraint evaluation tree may be more than that in the logic pattern for matching. Moreover, as the same as the navigation pattern, a same constraint evaluation tree may match multiple logic patterns.

Next, at the step S1609 of FIG. 16, the logic failure analyzer 1304 decides whether there is a lower-level logic pattern, for example, a third-level logic pattern, a fourth-level logic pattern, or the like. If there is a lower-level logic pattern, the process returns to the step S1607, where the lower-level logic pattern is performed the matching operation through the same process as the above to find multiple matching logic patterns that might exist.

In the decision of the step S1609, if the logic failure analyzer 1304 decides that there is no lower-level logic pattern, the process proceeds to the step S1610.

Next, at the step S1610 of FIG. 16, the logic failure analyzer 1304 selects the most approximate matching logic pattern from among all the matching logic patterns. In the invention, it can be set that a logic pattern that has the most matching nodes (elements) is the most approximate matching logic pattern. This is the same manner of selecting the most approximate matching pattern as that in the navigation failure analyzer 1302.

Next, in the step S1612, the logic failure analyzer 1304 (a pattern information extractor (not shown) therein or connected thereto) extracts pattern information, namely pattern parameter, from the selected most approximate matching logic pattern. As described above, the invention defines the following basic information for a pattern: ID, Name, Description, Context, Denotation, Problem-Cause-Template, and so on, wherein the Problem-Cause-Template has Parameters and Description for describing the problem cause. In the present embodiment, the relevant information extracted by the logic failure analyzer 1304 may be the values of the Parameters in the above Problem-Cause-Template, and may also comprise other basic information.

After completing the above operations, as described previously, the logic failure analyzer 1304 (a pattern information extractor (not shown) therein or connected thereto) provides the obtained failure pattern and the extracted pattern information to the problem cause reporter 518, in which a report on the cause of the occurring problem is formed based on the provided failure pattern and pattern information and is presented to the model user. Then the process ends.

Now, returning to the step S1503 in FIG. 15.

If it is decided that there is a pattern annotation in the constraint evaluation tree at the step S1503, the process proceeds to the step S1509, where the analysis decider 1306 in the constraint violation analyzer 516 directly traverses respective nodes in the constraint evaluation tree to decide whether a failure occurs. If the analysis decider 1306 decides that a failure occurs in a node of the constraint evaluation tree, it locates the failure.

The above deciding and locating manners do not construct limitation to the technical scope of the invention, and may be any method that those skilled in this art know.

Since in a constraint evaluation tree with a pattern annotation the constraint is annotated with a structural pattern ID, the constraint evaluation tree corresponds to a particular pattern. Thus, as the step S1509, the analysis decider 1306 in the constraint violation analyzer 516 recognizes the patterns (the navigation pattern or the logic pattern) corresponding to the failure node according to the located failure and the pattern ID in the constraint evaluation tree, as the patterns that matches the failure.

Namely, upon detecting that the constraint evaluation tree contains the pattern annotation (pattern ID), the analysis decider 1306 in the constraint violation analyzer 516 receives the defined constraint pattern 510 from the constraint pattern definer 508, and traverses respective nodes in the constraint evaluation tree, finds the node where the failure is located, and selects one or more matching patterns corresponding to the failure from among the constraint patterns according to the found failure node and the pattern ID corresponding thereto.

Next, at the step S1510, the pattern information extractor (not shown) in the constraint violation analyzer 516 extracts the relevant information, namely pattern parameter, in the determined matching pattern. As described above, the invention defines the following basic information for a pattern: ID, Name, Description, Context, Denotation, Problem-Cause-Template, and so on, in which the Problem-Cause-Template has Parameters and Description for describing the problem cause. In the present embodiment, the relevant information extracted by the pattern information extractor may be the values of the Parameters in the above Problem-Cause-Template, and may also comprise other basic information.

After completing the above operations, as described previously, the pattern information extractor (not shown) provides the obtained failure pattern and the extracted relevant information to the problem cause reporter 518, in which a report on the cause of the occurring problem is formed based on the provided failure pattern and relevant information and is presented to the model user.

It needs to be noted that the embodiments of the invention may be implemented by means of hardware, software, and/or a combination thereof, and the implementations do not construct a limitation to the technical scope of the invention.

Further, connection relationships among respective elements (units) in the embodiments of the invention do not construct a limitation to the technical scope of the invention, and one or more functional elements therein may be included or connected to any other functional elements. For example, the analysis decider 1306 in FIG. 15 may be contained in the navigation failure analyzer 1302 and the logic failure analyzer 1304 respectively, or connected to them independently from outside respectively.

While some embodiments of the invention have been shown and described in detail in connection with the drawings, it is to be understood by those skilled in the art that changes and variations may be made to these embodiments without departing from the spirit or scope of the invention defined by the following claims and the equivalents thereof.

The invention claimed is:

1. A method of performing a constraint failure analysis on an instance model, comprising steps of:
    defining a plurality of patterns for a constraint of a standard model, the plurality of patterns containing a navigation pattern and a logic pattern;
    determining whether a null node in a constraint evaluation tree generated by the instance model exists; and
    performing a failure analysis on the constraint evaluation tree based on the navigation pattern if the null node exists, and performing the failure analysis on the constraint evaluation tree based on the logic pattern if no null node exists.

2. The method of claim 1, further comprising a step of resolving said plurality of patterns into a pattern parsing tree, and sequentially comparing respective nodes in said constraint evaluation tree to all nodes in said pattern parsing tree in a same order to find one or more matching patterns.

3. The method of claim 1, wherein a node in the constraint evaluation tree is annotated with a pattern ID, and the method further comprising a step of selecting one or more matching patterns from said plurality of patterns according to said pattern ID.

4. The method of claim 2, wherein said sequentially comparing indicates that a type or numerical value of a node in the constraint evaluation tree is identical to that of a corresponding node in the pattern parsing tree.

5. The method of claim 2, further comprising a step of selecting a most approximate matching pattern from the one or more matching patterns, said most approximate matching pattern being a pattern with the most nodes that match the constraint evaluation tree.

6. The method of claim 5, further comprising a step of extracting a parameter item and/or a description item for describing a root cause of the constraint violation from the most approximate matching pattern to generate a problem cause report.

7. The method of claim 1, wherein said logic pattern has multiple levels, and the method further comprising a step of obtaining a logic pattern of a currently available level and sequentially comparing all nodes in the obtained logic pattern of the currently available level and the logic pattern of a lower-level to respective nodes in said constraint evaluation tree.

8. The method of claim 1, wherein said navigation pattern is used to define a path between respective units in the standard model, and the logic pattern is used to define a logic relationship between navigation patterns.

9. A device for performing a constraint failure analysis on an instance model, comprising:
an analysis decider module implemented via a computing device for determining whether a null node exists in a constraint evaluation tree generated by the instance model; and
a failure analyzer module implemented via the computing device for performing a failure analysis on the constraint evaluation tree based on a navigation pattern if the null node exists, and performing the failure analysis on the constraint evaluation tree based on a logic pattern if no null node exists.

10. The device of claim 9, further comprising:
a constraint pattern definer for defining a plurality of patterns for a constraint of a model, the plurality of patterns containing the navigation pattern and the logic pattern, said navigation pattern being used to define a path between respective units in the instance model, and the logic pattern being used to define a logic relationship between the navigation patterns.

11. The device of claim 10, further comprising:
a pattern parser for resolving said pattern into a pattern parsing tree,
wherein said failure analyzer sequentially compares respective nodes in said constraint evaluation tree with all nodes in said pattern parsing tree in a same order to find one or more matching patterns.

12. The device of claim 10, wherein nodes in the constraint evaluation tree are annotated with a pattern ID, and said analysis decider selects one or more matching patterns from said plurality of patterns according to said pattern ID.

13. The device of claim 11, wherein said failure analyzer indicates that a type or a numerical value of the respective nodes in the constraint evaluation tree to be identical to that of corresponding nodes in said pattern parsing tree.

14. The device of claim 11, wherein said failure analyzer selects a most approximate matching pattern from the one or more matching patterns, said most approximate matching pattern being a pattern with the most nodes that match the constraint evaluation tree.

15. The device of claim 14, further comprising:
a problem cause reporter for extracting a parameter item and/or a description item for describing a root cause of a constraint violation from the most approximate matching pattern to generate a problem cause report.

16. The device of claim 11, wherein said logic pattern has multiple levels, and said failure analyzer obtains a logic pattern of a currently available level, and sequentially compares all nodes in the obtained logic pattern of the currently available level and a logic pattern of a lower-level with the respective nodes in said constraint evaluation tree.

17. A method of defining a constraint pattern, comprising:
defining a plurality of patterns for a constraint of a model;
resolving the plurality of patterns into a logic pattern and/or a navigation pattern, said navigation pattern being used to define a path between respective units in the model, and the logic pattern being used to define a logic relationship between navigation patterns;
determining whether a null node in a constraint evaluation tree generated by an instance model exists; and
performing a failure analysis on the constraint evaluation tree based on said navigation pattern if the null node exists and performing the failure analysis on the constraint evaluation tree based on the logic pattern if no null node exists.

18. The method of claim 17, wherein said logic pattern refers to multiple navigation patterns.

19. The method of claim 17, wherein said logic pattern has multiple levels, and different logic patterns contain basic information with different details.

20. The method of claim 17, wherein said logic pattern contains a parameter item and/or a description item for describing a root cause of a constraint violation.

* * * * *